(12) United States Patent
Furuta

(10) Patent No.: US 7,776,721 B2
(45) Date of Patent: Aug. 17, 2010

(54) LASER PROCESSING METHOD FOR GALLIUM ARSENIDE WAFER

(75) Inventor: Kenji Furuta, Ota-ku (JP)

(73) Assignee: Disco Corporation, Tokyo (JP)

( * ) Notice: Subject to any disclaimer, the term of this patent is extended or adjusted under 35 U.S.C. 154(b) by 229 days.

(21) Appl. No.: 11/974,429

(22) Filed: Oct. 12, 2007

(65) Prior Publication Data

US 2008/0090381 A1 Apr. 17, 2008

(30) Foreign Application Priority Data

Oct. 17, 2006 (JP) .............................. 2006-282332

(51) Int. Cl.
*H01L 21/304* (2006.01)
(52) U.S. Cl. ................ 438/463; 438/465; 257/E21.599
(58) Field of Classification Search ........................ None
See application file for complete search history.

(56) References Cited

U.S. PATENT DOCUMENTS 6,670,269 B2 * 12/2003 Mashino ..................... 438/637
2004/0112880 A1 * 6/2004 Sekiya .................. 219/121.69
2006/0035411 A1 * 2/2006 Oba et al. .................... 438/113
2006/0128121 A1 * 6/2006 Hsu ............................ 438/465
2006/0205182 A1 * 9/2006 Soejima ...................... 438/460

FOREIGN PATENT DOCUMENTS

JP          10-305420         11/1998
JP          2004-188475       7/2004

* cited by examiner

*Primary Examiner*—Evan Pert
*Assistant Examiner*—Andres Munoz
(74) *Attorney, Agent, or Firm*—Greer, Burns & Crain, Ltd.

(57) ABSTRACT

A laser processing method for a gallium arsenide wafer of radiating a laser beam along streets formed in lattice on a surface of a gallium arsenide substrate, and cutting-off the gallium arsenide wafer along the streets includes a wafer supporting step for sticking a rear surface of the gallium arsenide substrate on a protective member, a debris shielding coating step for coating the surface of the gallium arsenide substrate with a debris shielding film, a laser-processed trench forming step for radiating a laser beam along the streets from the debris shielding film side to the gallium arsenide substrate, thereby forming laser-processed trenches each not reaching the rear surface, and a cutting-off step for radiating the laser beam along the laser-processed trenches to the gallium arsenide substrate, thereby forming cutting-off trenches each reaching the rear surface.

4 Claims, 10 Drawing Sheets

LASER PROCESSING METHOD FOR GALLIUM ARSENIDE WAFER

This application claims priority from JP 2006-282332, which was filed on Oct. 17, 2006.

BACKGROUND OF THE INVENTION

1. Field of the Invention

The present invention relates to a laser processing method for a gallium arsenide wafer in which a laser beam is radiated to a gallium arsenide (GaAs) wafer along division-intended lines formed on the gallium arsenide (GaAs) wafer, thereby cutting off the gallium arsenide (GaAs) wafer along the division-intended lines.

2. Description of the Related Art

As well known to those skilled in the art, in processes for manufacturing a semiconductor device, a semiconductor wafer is formed in which a plurality of devices such as ICs or LSIs are formed in matrix on a surface of a silicon substrate. The semiconductor wafer thus formed is partitioned along division-intended lines called "streets", and is cut off along the streets, thereby manufacturing individual semiconductor chips. In addition, a gallium arsenide (GaAs) wafer having a gallium arsenide (GaAs) substrate on a surface of which high-performance devices such as hybrid ICs or high-speed ICs are formed is put to practical use. With regard to a method of cutting off a semiconductor wafer composed of a silicon wafer, or such a gallium arsenide (GaAs) wafer along streets, the following technique is proposed. That is to say, a pulsed laser beam is radiated to a wafer along streets formed on the wafer to subject the wafer to ablation processing, thereby forming laser-processed trenches in the wafer. This technique, for example, is described in Japanese Patent Laid-Open No. Hei 10-305420.

However, when the laser beam is radiated to the wafer along the streets formed on the wafer to carry out the ablation processing, there is newly caused a problem that a heat energy is concentrated on a region to which the laser beam is radiated, thereby generating debris, and the debris are attached on surfaces of devices to reduce a quality of each of chips. In order to solve such a problem due to attachment of the debris, there is proposed a laser processing method of coating a surface to be processed of a wafer with a debris shielding film made of a liquid resin such as polyvinyl alcohol, and radiating a laser beam to the wafer through the debris shielding film. This laser processing method, for example, is described in Japanese Patent Laid-Open No. 2004-188475.

However, when the gallium arsenide (GaAs) wafer is cut off by utilizing the laser processing method described above, there is encountered a problem that a transverse rupture strength of each of the individual chips obtained through the division is reduced. According to experiments made by the inventor of the present invention, when the silicon wafer is cut off by utilizing the above laser processing method, the transverse rupture strength of each of the chips is reduced if the debris are attached on a cut surface of each of the chips obtained through the division. However, it become clear that when the gallium arsenide (GaAs) wafer is cut off by utilizing the above laser processing method, the transverse rupture strength further increases in the case where the debris are attached on the cut surface of each of the chips obtained through the division than in the case where no debris is attached thereon.

SUMMARY OF THE INVENTION

It is therefore an object of the present invention to provide a laser processing method for a gallium arsenide wafer with which debris generated by radiating a laser beam to a gallium arsenide (GaAs) wafer can be attached on a cut surface when the laser beam is radiated to the gallium arsenide (GaAs) wafer along streets formed on the surface of the gallium arsenide (GaAs) wafer to carry out ablation processing, thereby cutting off the gallium arsenide (GaAs) wafer along the streets.

In accordance with an aspect of the present invention, there is provided a laser processing method for a gallium arsenide wafer in which a laser beam is radiated along streets of the gallium arsenide wafer on which devices are formed in a plurality of regions obtained through partition by the streets formed in lattice on a surface of the gallium arsenide substrate, thereby cutting off the gallium arsenide wafer along the streets, the method including: a wafer supporting step for sticking a rear surface of the gallium arsenide substrate on a protective member; a shielding film coating step for coating a surface of the gallium arsenide substrate having the rear surface stuck on the protective member with a debris shielding film; a laser-processed trench forming step for radiating a laser beam with a wavelength having an absorption property for the gallium arsenide substrate along the streets from the debris shielding film side to the gallium arsenide substrate having the surface coated with the debris shielding film, thereby forming laser-processed trenches each not reaching the rear surface along the streets; and a cutting-off step for radiating the laser beam with the wavelength having the absorption property for the gallium arsenide substrate along the laser-processed trenches to the gallium arsenide substrate having the laser-processed trenches formed therein, thereby forming cut-off trenches each reaching the rear surface along the respective laser-processed trenches.

Preferably, in the laser-processed trench forming step, the laser-processed trenches are formed each of which is equal to or larger than half a thickness of the gallium arsenide substrate, and in the cutting-off step, the cut-off trenches each reaching the rear surface are formed by one radiation of the laser beam.

In accordance with the laser processing method for a gallium arsenide wafer of the present invention, after the laser-processed trenches each not reaching the rear surface are formed along the streets on the gallium arsenide substrate by carrying out the laser-processed trench forming step, there is carried out the cutting-off step for forming the cut-off trenches each reaching the rear surface by radiating the laser beam along the laser-processed trenches. As a result, the debris which are generated and scattered by the radiation of the laser beam in the cutting-off step is attached on an upper portion of a wall surface (cut surface) of each of the above laser processed trenches. Consequently, the transverse rupture strength of each of the chips increases because the fine debris are attached on the vicinity of the surface in each of the cut surfaces of the chips obtained through the division made along the streets formed on the gallium arsenide substrate. In addition, in the present invention, the surface of the gallium arsenide substrate is coated with the debris shielding film by carrying out the debris shielding film coating step before each of the above laser-processed trench forming step and the above cutting-off step is carried out. Consequently, the debris which are generated and scattered by the radiation of the laser beam when the laser-processed trench forming step and the cutting-off step are carried out are prevented from being attached on any of the devices because they are blocked off by the debris shielding film.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
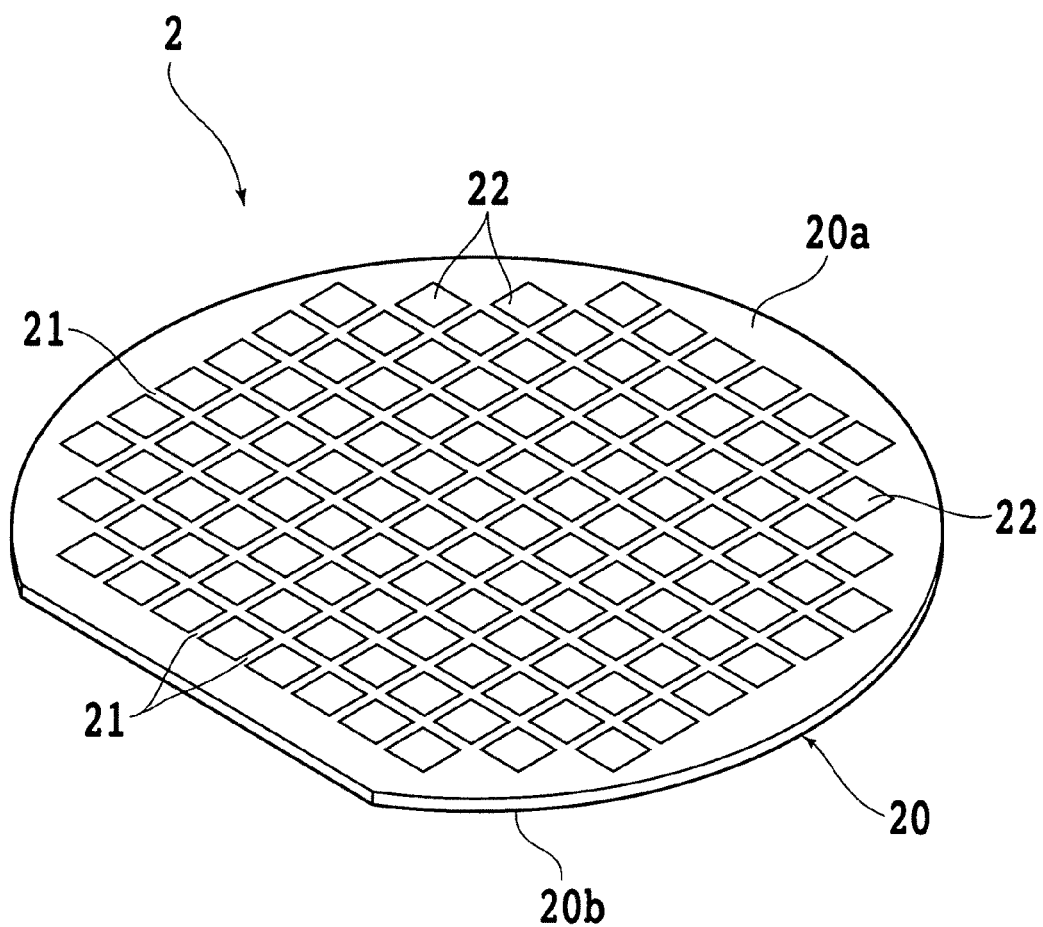
FIG. 1 is a perspective view of a gallium arsenide wafer which is intended to be divided into individual chips by utilizing a laser processing method for a gallium arsenide wafer according to the present invention.
Figure 2A:
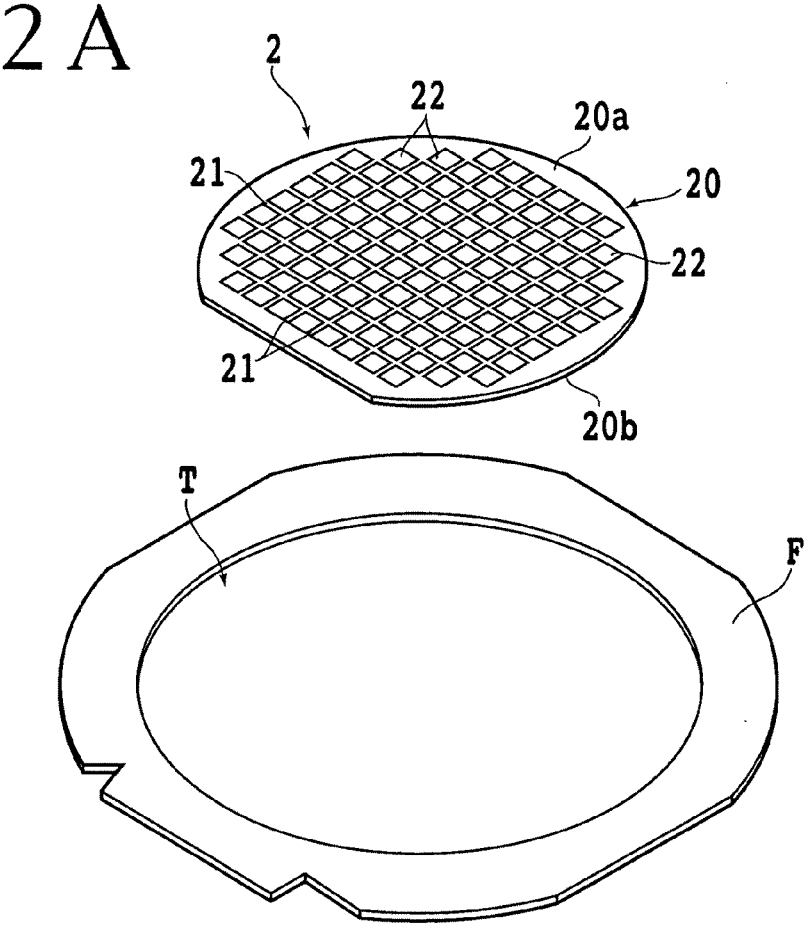
FIGS. 2A and 2B are respectively views explaining a wafer supporting step in the laser processing method for a gallium arsenide wafer according to the present invention.
Figure 2B:
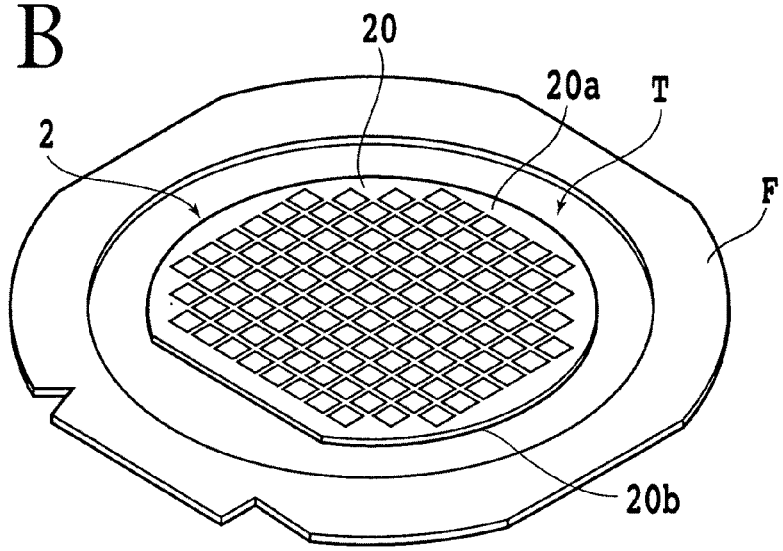

Hereinafter, a preferred embodiment of a laser processing method for a gallium arsenide wafer according to the present invention with reference to the accompanying drawings. FIG. 1 shows a perspective view of a gallium arsenide wafer. In the gallium arsenide wafer 2 shown in FIG. 1, a plurality of streets 21 are formed in lattice on a surface 20a of a gallium arsenide (GaAs) substrate 20, for example, having a thickness of 100 μm. Also, devices 22 such as hybrid ICs or high-speed ICs are formed in a plurality of regions which are obtained through partition using a plurality of streets 21 formed in lattice on the surface 20a of the gallium arsenide (GaAs) substrate 20. A rear surface 20b of the gallium arsenide wafer 2 described above is stuck on a surface of a protective tape T as a protective member having a peripheral portion which is mounted to an annular frame F so as to cover an inner opening portion of the annular frame F as shown in FIGS. 2A and 2B (wafer supporting step). It is noted that in the embodiment shown in the figures, the protective tape T described above is formed such that an acrylic resin system adhesive layer having a thickness of about 5 μm is applied to a surface of a sheet substrate made of polyvinyl chloride (PVC) having a thickness of 80 μm.

Figure 3A:
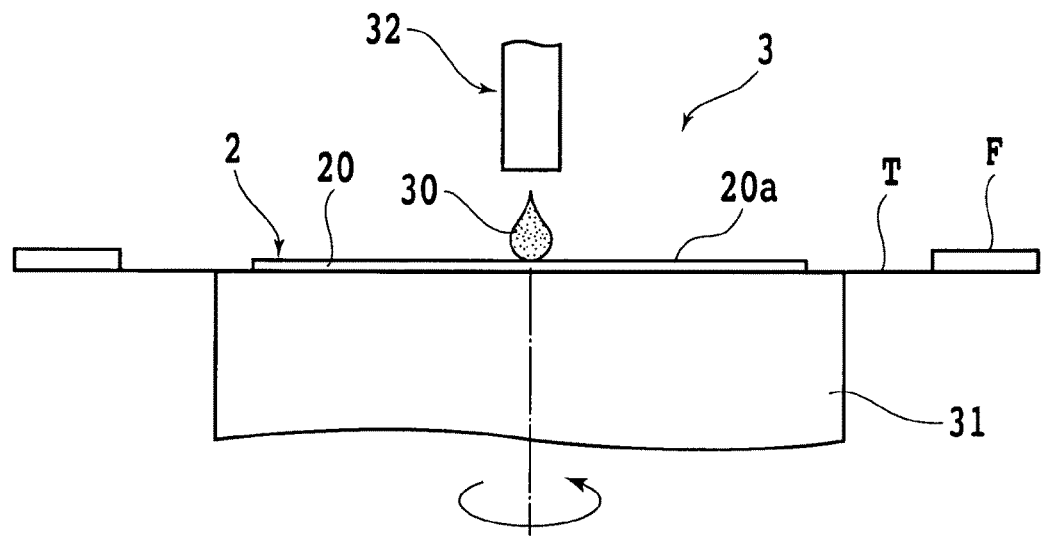
FIGS. 3A and 3B are respectively views explaining a debris shielding film coating step in the laser processing method for a gallium arsenide wafer according to the present invention.
Figure 3B:
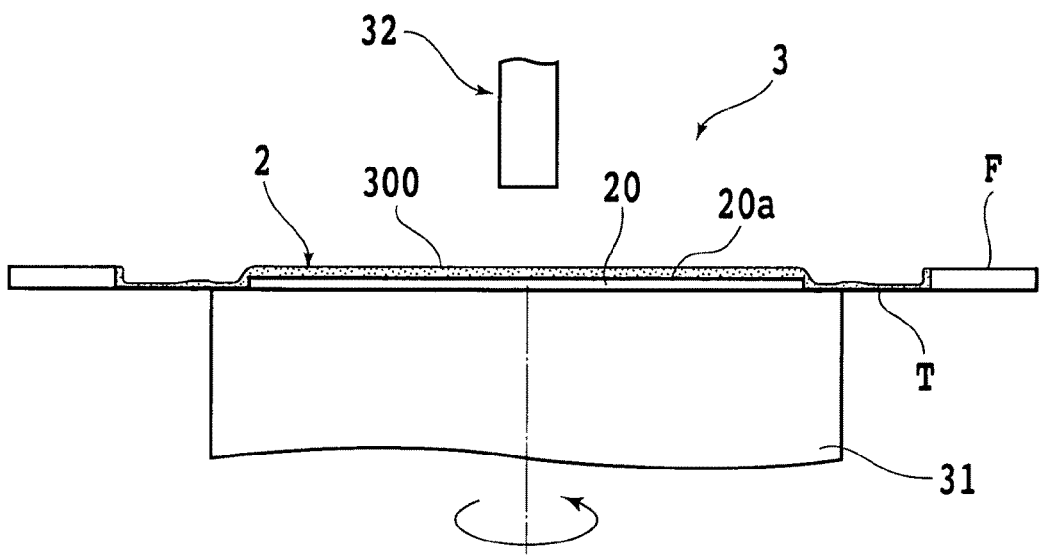

After the wafer supporting step described above is carried out, there is carried out a debris shielding film coating step for coating the surface 20a of the gallium arsenide (GaAs) substrate 20 stuck on the protective tape T as the protective member with a debris shielding film. The debris shielding film coating step will now be described with reference to FIGS. 3A and 3B. In the debris shielding film coating step, firstly, as shown in FIG. 3A, the gallium arsenide wafer 2 which is supported by the annular frame F through the protective tape T is placed on a spinner table 31 of shielding film forming equipment 3. Also, the gallium arsenide wafer 2 is sucked and held on the spinner table 31 by operating suction means (not shown). At this time, the annular frame F is also fixed onto the spinner table 31 by a frame clamp (not shown) mounted to the spinner table 31. After the gallium arsenide wafer 2 is sucked and held on the spinner table 31 in the manner as described above, a predetermined amount of liquid resin 30 is made to fall in drops from a resin liquid supplying nozzle 32 disposed above the spinner table 31 to a central region of the surface 20a of the gallium arsenide (GaAs) substrate 20 while the spinner table 31 is rotated at a predetermined rotating speed (of, for example, 300 to 1,000 rpm) in a direction indicated by an arrow. Also, by rotating the spinner table 31 for about 60 seconds, as shown in FIG. 3B, the surface 20a of the gallium arsenide (GaAs) substrate 20 is coated with a debris shielding film 300. Although a thickness of the debris shielding film 300 depends on an amount of liquid resin 30 dropped, the debris shielding film 300 can be formed to have up to a small thickness of 1 to 10 μm. It is noted that a soluble resist such as poly vinyl alcohol (PVA), poly ethylene glycol (PEG) or a poly ethylene oxide (PEO) is preferably used as the liquid resin 30.

Figure 4:
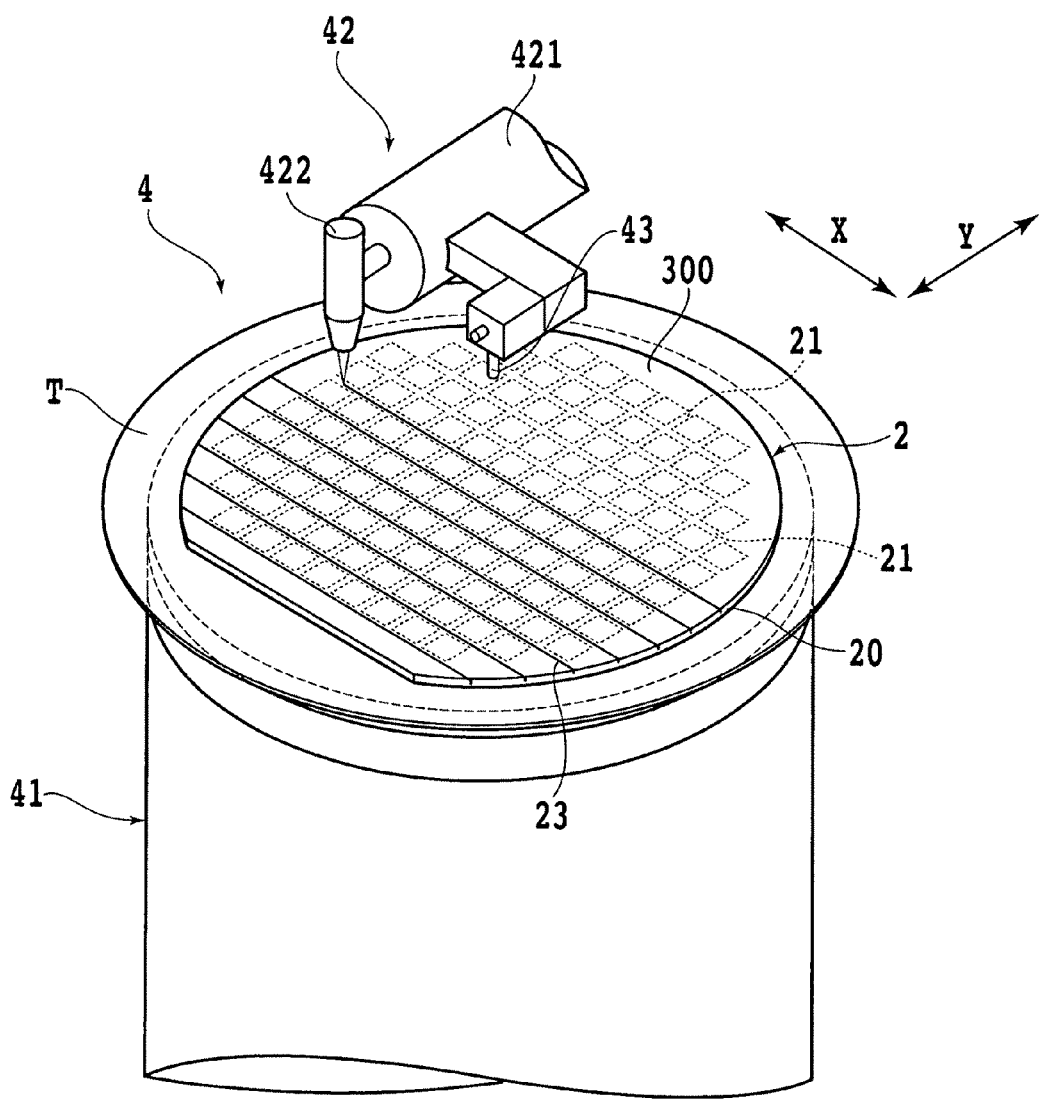
FIG. 4 is a perspective view of a main portion of laser processing equipment for carrying out a laser-processed trench forming step and a cutting-off step in the laser processing method for a gallium arsenide wafer according to the present invention.

After the debris shielding film coating step described above is carried out, there are carried out a laser-processed trench forming step for radiating a laser beam with a wavelength having an absorption property for the gallium arsenide (GaAs) substrate 20 along the streets 21 from the debris shielding film 300 side to the gallium arsenide (GaAs) substrate 20 having the surface 20a coated with the debris shielding film 300, thereby forming laser-processed trenches each not reaching a rear surface 20b along the streets 21, and a cutting-off step for radiating the laser beam with the wavelength having the absorption property for the gallium arsenide (GaAs) substrate 20 along the laser-processed trenches to the gallium arsenide (GaAs) substrate 20 having the laser-processed trenches formed therein, thereby forming cut-off trenches each reaching the rear surface 20b along the respective laser-processed trenches. The laser-processed forming step and the cutting-off step are carried out by using laser processing equipment 4 shown in FIG. 4. The laser processing equipment 4 shown in FIG. 4 includes a chuck table 41 for holding thereon a work piece, laser beam radiating means 42 for radiating a laser beam to the work piece held on the chuck table 41, and image pick-up means 43 for capturing an image of the work piece held on the chuck table 41.

The chuck table 41 is constructed so as to suck and hold thereon the work piece. Also the chuck table 41 is adapted to be moved in a processing feeding direction indicated by an arrow X in FIG. 4, and in a division feeding direction indicated by an arrow Y in FIG. 4 by a movement mechanism (not shown). The laser beam radiating means 42 described above includes a cylindrical casing 421 which is substantially, horizontally disposed. Pulsed laser beam oscillating means (not shown) including a pulsed laser beam oscillator constituted by a YAG laser oscillator or a YVO4 laser oscillator, and repetition frequency setting means is disposed within the casing 421. A condenser 422 for condensing a pulsed laser beam emitted from the pulsed laser beam oscillating means is mounted to a head portion of the above casing 421.

The image pickup means 43 mounted to the head portion of the above casing 421 constituting the laser beam radiating means 42 described above is composed of infrared radiation illuminating means for radiating an infrared radiation to the work piece, an optical system for capturing the infrared radiation radiated by the infrared radiation illuminating means, an image pickup element (infrared CCD) for outputting an electrical signal corresponding to the infrared radiation captured by the optical system, and the like in addition to a normal image pickup element (CCD) for performing image capturing by using a visible light in the embodiment shown in the figures. Also, the image pickup means 43 sends a video signal generated through the image capturing to control means (not shown).

The above laser-processed trench forming step which is carried out by using the above laser processing equipment 4 will described hereinafter with reference to FIGS. 5A and 5B, and FIG. 6. Firstly, the gallium arsenide wafer 2 stuck on the protective taper T mounted to the annular frame F is placed on the chuck table 41 of the above laser processing equipment 4 shown in FIG. 4, and is then sucked and held on the chuck table 41. At this time, the gallium arsenide wafer 2 is held in a state in which the debris shielding film 300 with which the surface 20a of the gallium arsenide (GaAs) substrate 20 is coated turns up. It is noted that although the annular frame F having the protective tape T mounted thereto is omitted in its illustration in FIG. 4, the annular frame F is fixed onto the chuck table 41 by the frame clamp (not shown) disposed in the chuck table 41. The chuck table 41 which sucks and holds thereon the gallium arsenide wafer 2 in the manner as described above is positioned right under the image pickup means 43 by the movement mechanism (not shown).

After the chuck table 41 is positioned right under the image pickup means 43, the image pickup means 43 and the control means (not shown) carry out an alignment work for detecting a region to be laser-processed of the gallium arsenide wafer 2. That is to say, the image pickup means 43 and the control means (not shown) execute image processing, such as pattern matching, for performing alignment between each of the streets 21 formed in a predetermined direction on the surface 20a of the gallium arsenide (GaAs) substrate 20, and the condenser 422 of the laser beam radiating means 42 for radiating the laser beam to the gallium arsenide (GaAs) substrate 20 along the streets 21. Thus, the image pickup means 43 and the control means (not shown) carry out the alignment for the position to which the laser beam is intended to be radiated (alignment step). In addition, likewise, the alignment for the position to which the laser beam is intended to be radiated is carried out for each of the streets 21 as well each extending at right angles to the streets 21 which are formed in the predetermined direction on the surface 20a of the gallium arsenide (GaAs) substrate 20. At this time, although the debris shielding film 300 is formed on the surface 20a of the gallium arsenide (GaAs) substrate 20 on which the streets 21 are formed, when the debris shielding film 300 is opaque, the alignment can be carried out from the surface by capturing the images of the streets 21 by using the infrared radiation.

Figure 5A:
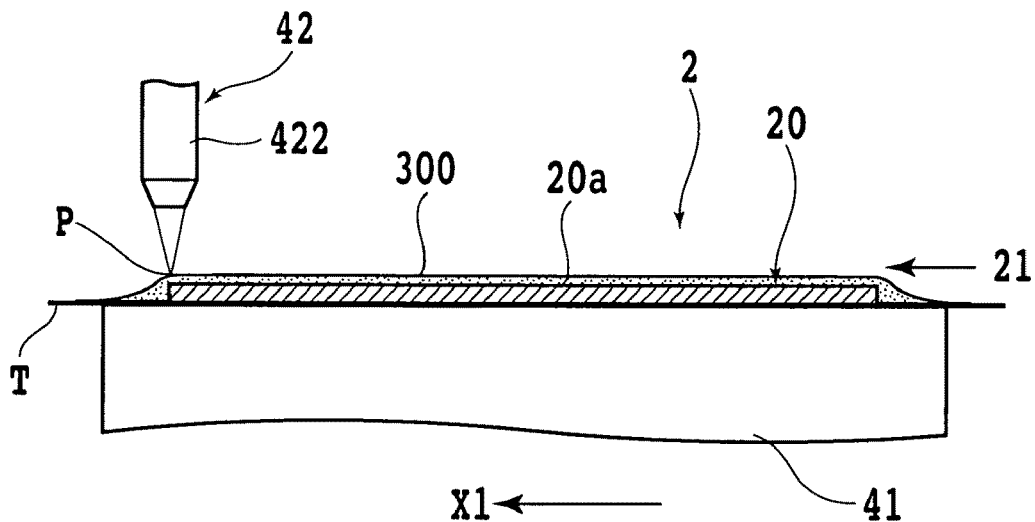
FIGS. 5A and 5B are respectively views explaining the laser-processed trench forming step in the laser processing method for a gallium arsenide wafer according to the present invention.

When the streets 21 formed on the surface 20a of the gallium arsenide (GaAs) substrate 20 in the gallium arsenide wafer 2 sucked and held on the chuck table 41 are detected in the manner as described above, and the alignment for the position to which the laser beam is intended to be radiated is carried out, as shown in FIG. 5A, the chuck table 41 is moved to the laser beam radiation region in which the condenser 422 of the laser beam radiating means 42 is located, and predetermined one of the streets 21 is positioned right under the condenser 422. At this time, as shown in FIG. 5A, the gallium arsenide wafer 2 is positioned so that one end (a left-hand side end in FIG. 5A) of the predetermined street 21 formed on the gallium arsenide (GaAs) substrate 20 is located right under the condenser 422. Next, the chuck table 41 is moved at a predetermined processing speed in a direction indicated by an arrow X1 in FIG. 5A while the pulsed laser beam with the wavelength having the absorption for the gallium arsenide (GaAs) substrate 20 is radiated from the condenser 422 of the laser beam radiating means 4 to the gallium arsenide (GaAs) substrate 20. Also, when as shown in FIG. 5B, the other end (a right-hand side end in FIG. 5B) of the predetermined street 21 reaches a position right under the condenser 422, the radiation of the pulsed laser beam is stopped, and the movement of the chuck table 41 is also stopped. In the laser-processed trench forming step, a condensed point P of the pulsed laser beam is focused on the vicinity of the surface of the predetermined street 21.

Figure 5B:
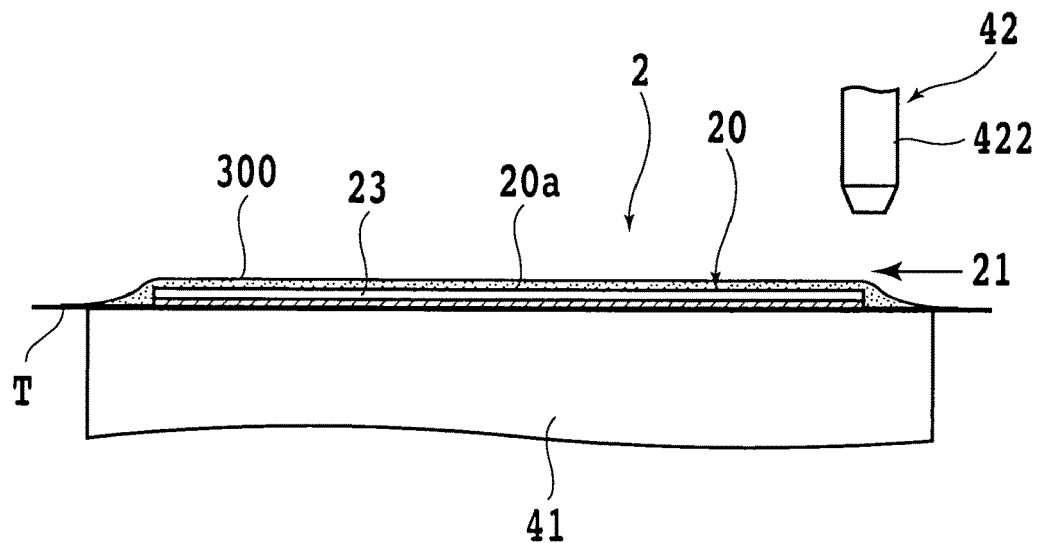
Figure 6:
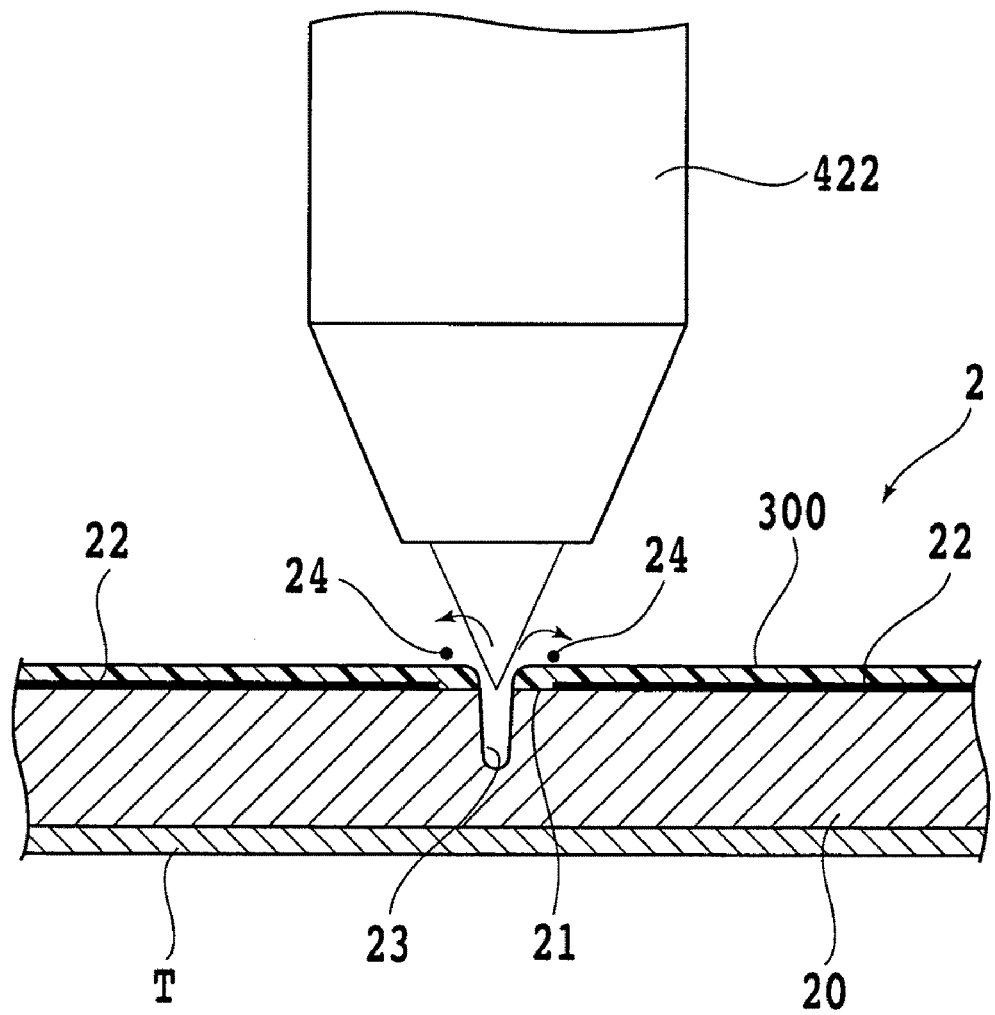
FIG. 6 is an enlarged cross sectional view of a main portion of the gallium arsenide wafer which is subjected to the laser processing by carrying out the laser-processed trench forming step shown in FIGS. 5A and 5B.

By carrying out the laser-processed trench forming step described above, the ablation processing is executed for the gallium arsenide (GaAs) substrate 20 along the streets 21, and the laser-processed trenches 23, as shown in FIG. 5B and FIG. 6, are formed in the gallium arsenide (GaAs) substrate 20 along the respective streets 21. It is important that none of the laser-processed trenches 23 formed in the laser-processed trench forming step reaches the rear surface 20b of the gallium arsenide (GaAs) substrate 20. Also, a depth of each of the laser-processed trenches 23 is preferably equal to or larger than half a thickness of the gallium arsenide (GaAs) substrate 20. It is noted that although in the laser-processed trench forming step, as shown in FIG. 6, debris 24 are generated and scattered by the radiation of the laser beam, the debris 24 are blocked off by the debris shielding film 300 and are prevented from being attached on any of the devices because the surface 20a of the gallium arsenide (GaAs) substrate 20 is coated with the debris shielding film 300.

Note that, the laser-processed trench forming step described above, for example, is carried out under the following processing conditions.

Light source of laser beam: YVO4 laser or YAG laser
Wavelength: 355 nm
Repetition frequency: 10 kHz
Output power: 4 W
Condensed spot diameter: 10 μm
Processing feeding speed: 400 mm/second Carrying out the laser-processed trench forming step under the processing conditions described above makes it possible to form the laser-processed trenches 23 each having a depth of 50 μm along the respective streets 21 in the gallium arsenide (GaAs) substrate 20.

Figure 7A:
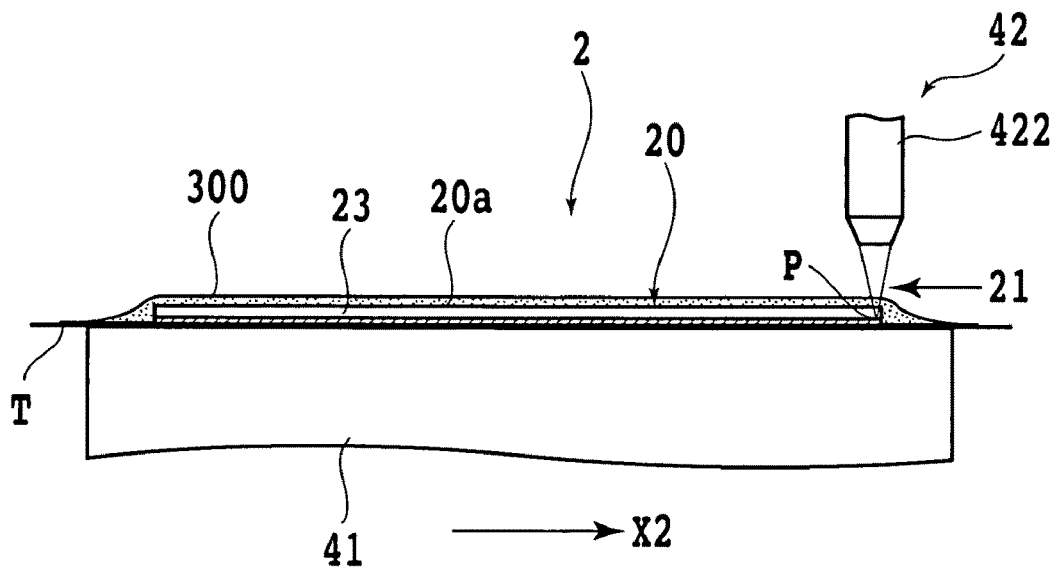
FIGS. 7A and 7B are respectively views explaining a cutting-off step in the laser processing method for a gallium arsenide wafer according to the present invention.
Figure 7B:
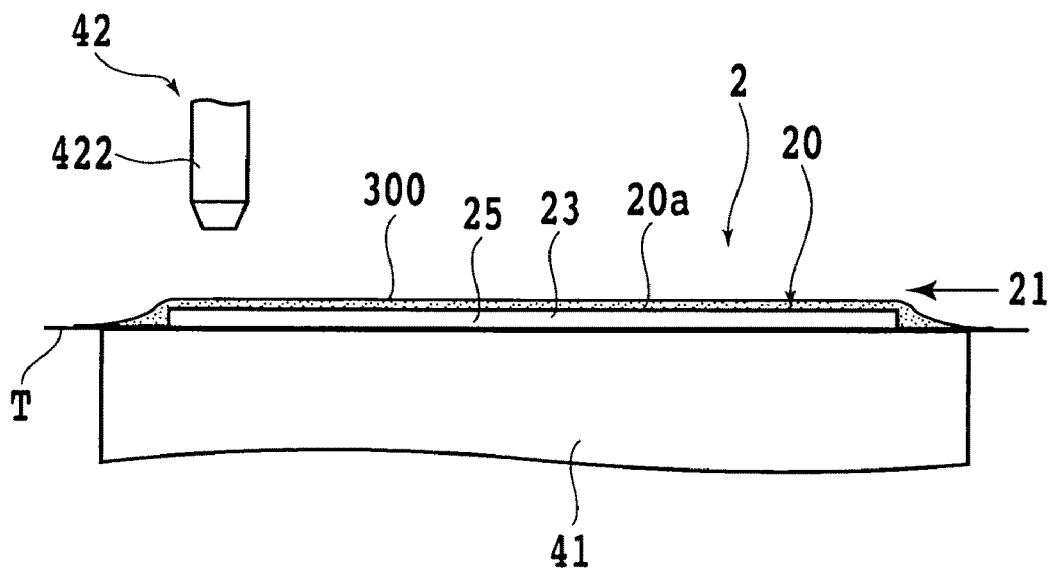

Next, there is carried out a cutting-off step for radiating the laser beam with the wavelength having the absorption property for the gallium arsenide (GaAs) substrate 20 along the laser-processed trenches 23 to the gallium arsenide (GaAs)

substrate 20 having the laser-processed trenches 23 formed therein, thereby forming cut-off trenches each reaching the rear surface 20b along the respective laser-processed trenches 23. That is to say, the chuck table 41 is moved at a predetermined processing speed in a direction indicated by an arrow X2 in FIG. 7A from the state, shown in FIG. 5B, of carrying out the laser-processed trench forming step described above while as shown in FIG. 7A, the pulsed laser beam with the wavelength having the absorption property for the gallium arsenide (GaAs) substrate 20 is radiated from the condenser 422 of the laser beam radiating means 4 to the gallium arsenide (GaAs) substrate 20. At this time, the condensed point P of the pulsed laser beam is focused on the vicinity of a bottom surface of each of the laser-processed trenches 23. Also, when the other end (the left-hand side end) of the predetermined street 21 reaches a position right under the condenser 422 as shown in FIG. 7B, the radiation of the pulsed laser beam is stopped, and the movement of the chuck table 41 is also stopped.

Figure 8:
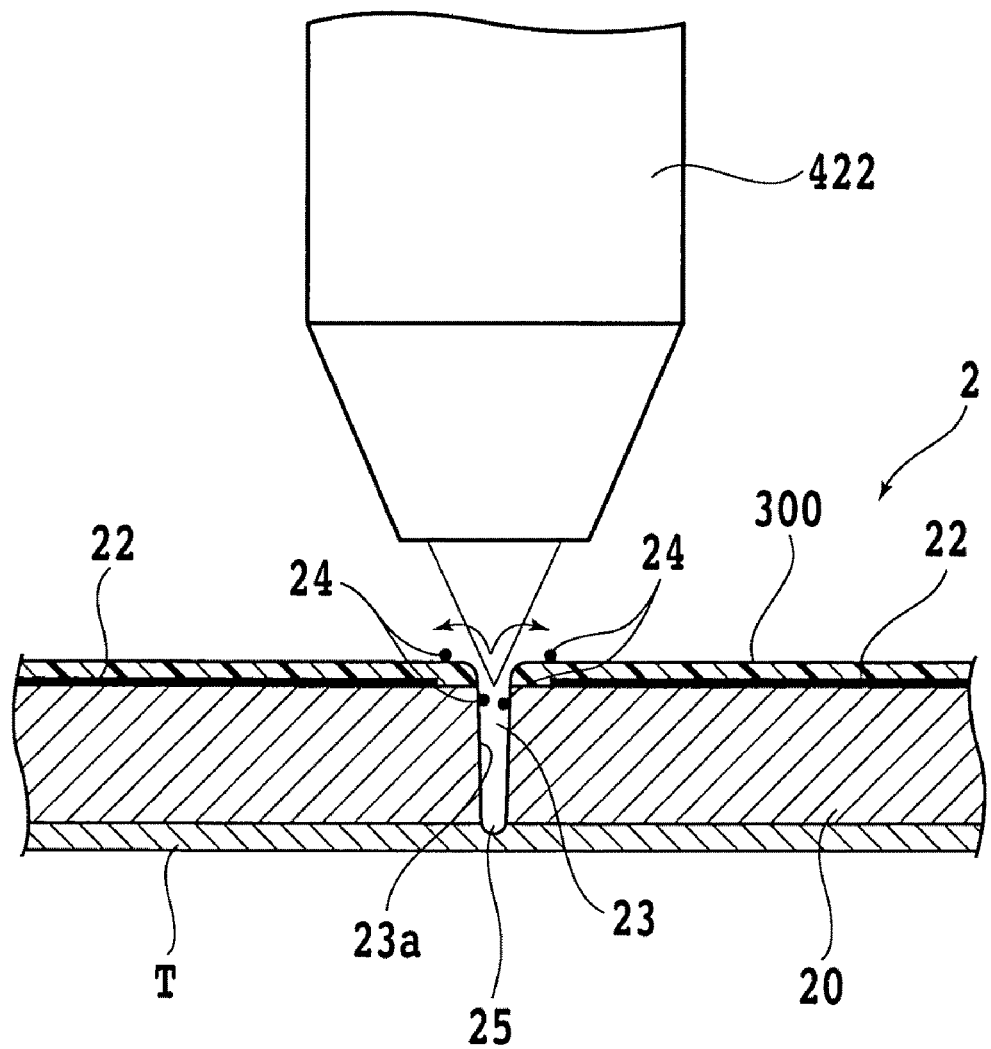
FIG. 8 is an enlarged cross sectional view of a main portion of the gallium arsenic wafer which is subjected to the laser processing by carrying out the cutting-off step shown in FIGS. 7A and 7B.
Figure 9:
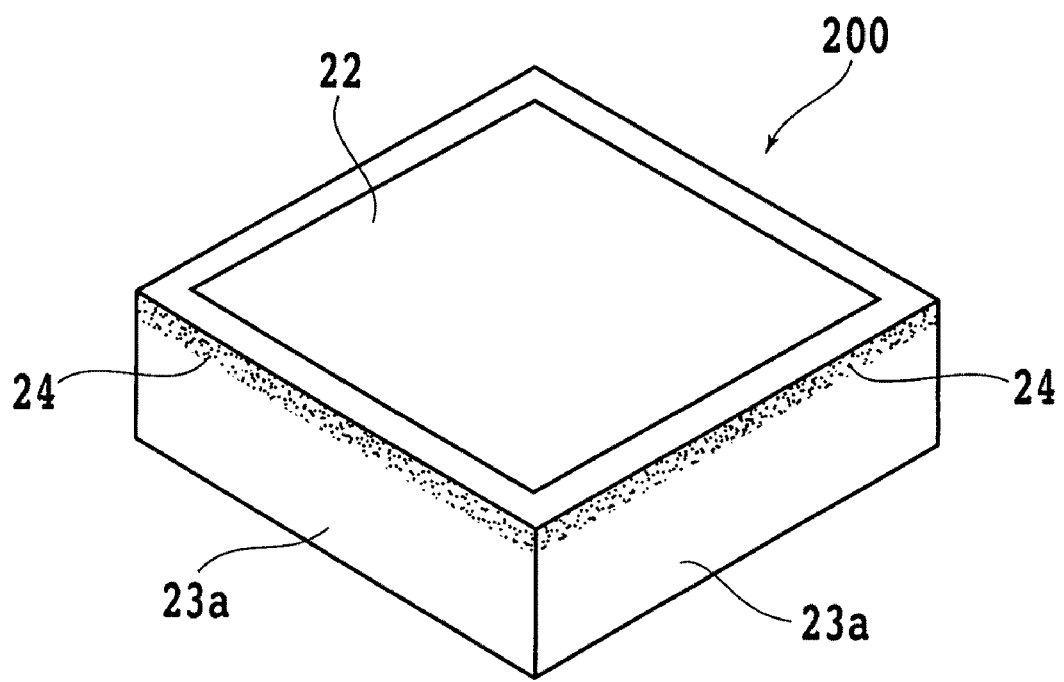
FIG. 9 is a perspective view of a chip which is obtained through division by utilizing the laser processing method for a gallium arsenide wafer according to the present invention.

It is noted that the processing conditions in the above cutting-off step may be the same as those in the laser-processed trench forming step described above. Therefore, in the cutting-off step as well, laser-processed trenches 25 each having a depth of 50 μm are formed along the above respective laser-processed trenches 23 in the gallium arsenide (GaAs) substrate 20. As a result, cut-off trenches 25 each reaching the rear surface 20b are formed along the respective laser-processed trenches 23 in the gallium arsenide (GaAs) substrate 20 having a thickness of 100 μm. It is noted that in the cutting-off step as well, as shown in FIG. 8, the debrises 24 are generated and scattered by the radiation of the laser beam similarly to the case of the laser-processed trench forming step described above.

These debris 24 are attached on each of upper portions of wall surfaces (cut-out surfaces) 23a of the laser-processed trenches 23. It is noted that these debris 24 have a particle diameter of 1 to 2 μm each, and are attached on each of the upper portions of the wall surfaces (cut-off surfaces) 23a of the laser-processed trenches 23 in a range of about 2 μm. In addition, although a part of the debris 24 is scattered onto the debris shielding film 300 as well with which the surface 20a of the gallium arsenide (GaAs) substrate 20 is coated, the debris 24 is prevented from being attached on any of the devices 22 because they are blocked off by the debris shielding film 300.

After the laser-processed trench forming step and cutting-off step described above are carried out along the streets 21, each extending in the predetermined direction, formed on the gallium arsenide (GaAs) substrate 20, the chuck table 41 is turned by 90°, and the laser-processed trench forming step and cutting-off step described above are carried out again along the streets 21 each extending at right angles to the predetermined direction. As a result, the gallium arsenide wafer 2 is divided into individual chips every device 22. It is noted that the individual chips obtained through the division for each device 22 are not disrupted because they are stuck on the surface of the protective tape T mounted to the annular frame F. Thus, the form of the gallium arsenide wafer 2 is maintained.

After the laser-processed trench forming step and the cutting-off step are carried out along all the streets formed on the gallium arsenide (GaAs) substrate 20 in the manner as described above, thereby dividing the gallium arsenide wafer 2 into the individual chips every device 22, the gallium arsenide wafer 2 is carried to cleaning equipment for carrying out a next cleaning step in a state of being stuck on the surface of the protective tape T mounted to the annular frame F. Although the gallium arsenide wafer 2 carried to the cleaning equipment is cleaned with rinse water, the debris shielding film 300 with which the surface 20a of the gallium arsenide (GaAs) substrate 20 is coated can be readily rinsed off because it is made of the soluble resin as described above.

EXAMPLE

Figure 10:
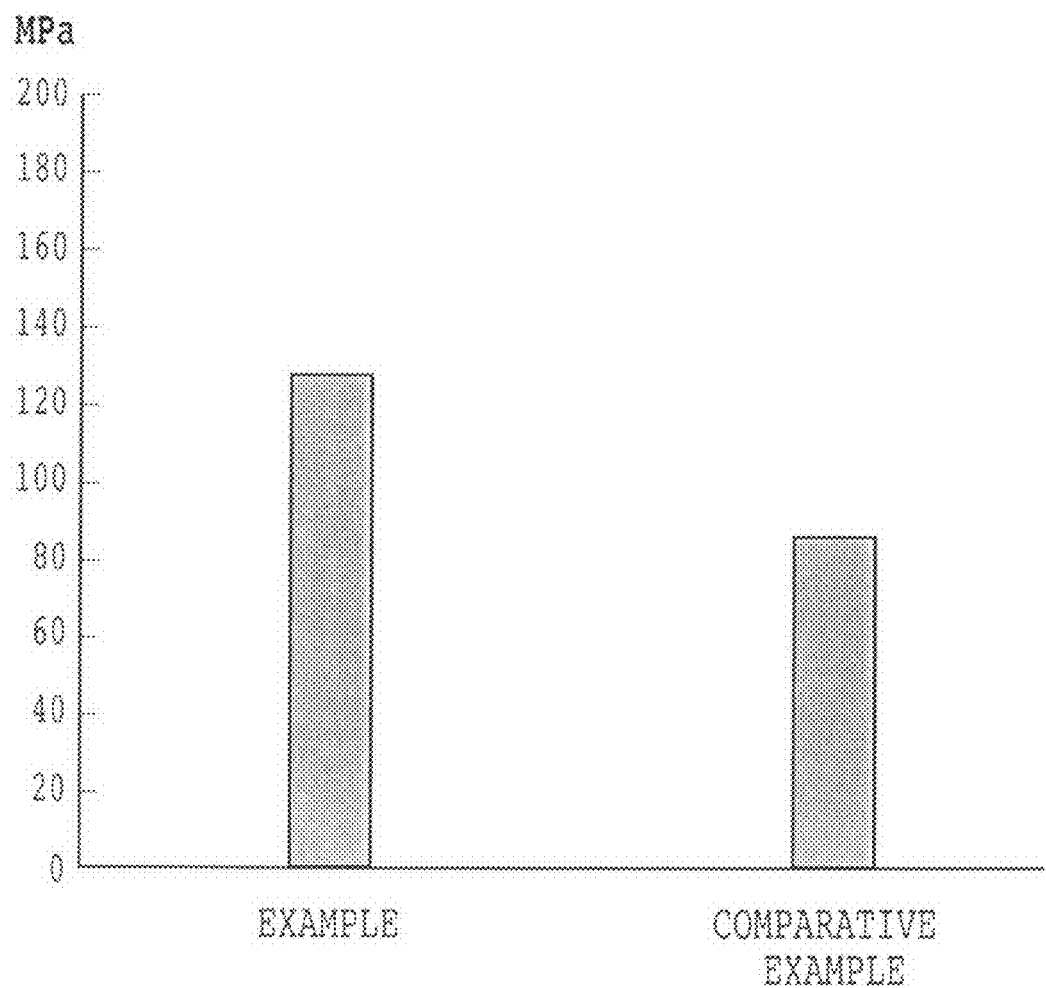
FIG. 10 is a graph showing results of measurements about transverse rupture strengths of chips in the laser processing method for a gallium arsenide wafer according to the present invention.

Here, an example of experiments made by the inventor of the present invention will now be described. The laser-processed trench forming step and cutting-off step described above were carried out, thereby dividing a gallium arsenide wafer which was 200 mm in diameter and 100 μm in thickness into individual chips. As a result, a chip 200 is manufactured which was 10 mm in width, 10 mm in length, and 100 μm in thickness. In the chip 200 thus manufactured, the debris 24 each having the particle diameter of 1 to 2 μm were attached on the vicinity of the surface of a gallium arsenide substrate, having the device 22 formed thereon, of each of the cut-off surfaces 23a in the range of about 2 μm. The transverse rupture strength was measured for ten chips 200 thus manufactured by utilizing a three-point bending test method. The results of the measurements about the transverse rupture strength are shown in FIG. 10. As shown in FIG. 10, a maximum value of the transverse rupture strength was 130 MPa, a minimum value thereof was 100 MPa, and an average value thereof was 114.0 MPa.

Comparative Example

One laser-processed trench forming step was carried out for a gallium arsenide wafer which was 200 mm in diameter and was 100 μm in thickness under the processing condition that the processing feeding speed was set at 200 mm/second in the laser-processed trench forming step described above, thereby dividing the gallium arsenide wafer into individual chips. Each of the chips thus manufactured was 10 mm in width, 10 mm in length, and 100 μm in thickness. A slight amount of debris was attached on the cross section of each of the chips thus manufactured. The transverse rupture strength was measured for ten chips thus manufactured by utilizing the three-point bending test method. As shown in FIG. 10, the results of the measurements show that a maximum value of the transverse rupture strength was 87 MPa, a minimum value thereof was 55 MPa, and an average value thereof was 70.2 MPa.

As a result, it is made clear from the above that the transverse rupture strength of each of the chips 200 into which the gallium arsenide wafer is divided by utilizing the laser processing method according to the present invention increases as compared with that of the comparative example by 62% or more in average value.

Although the present invention has been described so far based on the embodiment shown in the figures, the present invention is not intended to be limited to only the embodiment, and various changes can be made within the scope of the gist of the present invention. For example, although the embodiment described above has been shown in which one laser-processed trench forming step and one cutting-off step are carried out, the laser-processed trench forming processes may be carried out more than once depending on the thickness of the gallium arsenide (GaAs) substrate. In addition, although the embodiment described above has been shown in which the laser-processed trench forming step and the cutting-off step are continuously carried out along the same streets, the laser-processed trench forming step may be carried out along all the streets, and thereafter the cutting-off step may be carried out along all the streets.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing method for a gallium arsenide wafer in which a laser beam is radiated along streets of said gallium arsenide wafer in which devices are formed in a plurality of regions obtained through partition by said streets formed in lattice on a surface of said gallium arsenide wafer, thereby cutting off said gallium arsenide wafer along said streets, said method comprising:

a wafer supporting step for sticking a rear surface of said gallium arsenide wafer on a protective member;

a shielding film coating step for coating an upper surface of said gallium arsenide wafer having said rear surface stuck on said protective member with a debris shielding film;

a laser-processed trench forming step for radiating a laser beam with a wavelength having an absorption property for said gallium arsenide wafer along said streets from said debris shielding film side to said gallium arsenide wafer having said surface coated with said debris shielding film, thereby forming laser-processed trenches each not reaching said rear surface along said streets; and a cutting-off step for radiating the laser beam with the wavelength having the absorption property for said gallium arsenide wafer along said laser-processed trenches to said gallium arsenide wafer having said laser-processed trenches formed therein, thereby forming cut-off trenches each reaching said rear surface along said respective laser-processed trenches to thereby divide said wafer into individual devices and simultaneously having debris generated by the radiation of the laser beam attach to wall surfaces of said cut-off trenches, and wherein said debris attached to the wall surfaces of said cut-off trenches are not removed from the devices but allowed to remain attached to the devices and thereby increase the transverse rupture strength of said devices.

2. The laser processing method for the gallium arsenide wafer according to claim 1, wherein in said laser-processed trench forming step, said laser-processed trenches are formed each of which is equal to or larger than half a thickness of said gallium arsenide wafer, and in said cutting-off step, said cut-off trenches each reaching said rear surface are formed by one radiation of the laser beam.

3. A laser processing method for a gallium arsenide wafer according to claim 1, wherein said laser-processed trench forming step is carried out by focusing the laser beam in the vicinity of an upper surface of the each street while said cut-off step is carried out by focusing the laser beam in the vicinity of a bottom surface of the each laser-processed trench.

4. The laser processing method for a gallium arsenide wafer according to claim 1 further comprising a cleaning step for removing said debris shielding film from said gallium arsenide substrate after completion of said cutting-off step, and wherein said debris remain attached to the devices after said cleaning step.

* * * * *